INVENTOR
WILFRED N. HADLEY
BY Morse + Altman
ATTORNEYS

INVENTOR
WILFRED N. HADLEY
BY
ATTORNEYS

United States Patent Office 3,390,038
Patented June 25, 1968

3,390,038
METHOD AND APPARATUS FOR TRIMMING AND JOINING THE ENDS OF TWO WEB LENGTHS
Wilfred N. Hadley, Springfield, Vt., assignor to Hadley Company, Inc., Springfield, Vt., a corporation of Vermont
Filed May 12, 1964, Ser. No. 366,828
6 Claims. (Cl. 156—159)

ABSTRACT OF THE DISCLOSURE

Lengths of flexible webs, such as produced by the textile industry, are joined in end-to-end relation to provide a continuous web permitting processing of one web length after another without interruption. The method includes trimming and butting in end-to-end co-planar relation the opposing ends of two webs and then spraying a band of quick-setting liquid adhesive material containing a quantity of fiber glass strands randomly dispersed throughout. The band of tow and binder forms a thin, flexible stratum along the opposing marginal edges, firmly and flexibly joining the webs. The apparatus for carrying out the process involves a nipping mechanism which holds and trims web ends and a carriage adapted to transport a spray unit transversely across the web for spraying the tow and binder along the web edges.

---

Figure 1:
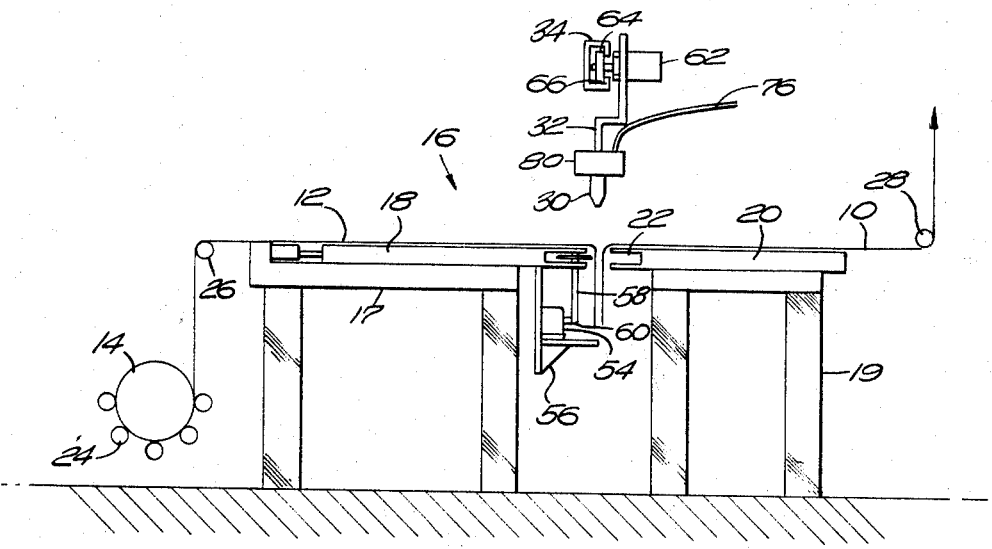

This invention relates generally to textile manufacturing and more particularly is directed towards a new and improved method and apparatus for trimming and joining the ends of two web lengths without substantially increasing the thickness of the web.

In the manufacture of woven, non-woven and knitted sheet materials, it is the practice to feed the web through one or more cloth shearing mechanisms where upstanding threads or fibers are trimmed to a uniform height. A shearing mechanism typically includes a high-speed rotary cutter which spans the width of the web as the cloth is passed in open face relation and in close proximity to the shearing blades.

In order to maintain a continuous run of cloth through the shearing machine, the practice has been to join the trailing end of one web length with the leading end of another web length. Normally, this has been done by sewing the two ends together. While this technique provides a strong connection, it also produces a thick seam which extends the full width of the cloth. The presence of the thick seam necessitated the development of devices for detecting the seam before it reaches the shearing mechanism and then opening the gap between the shearing blades and the web as the seam passes through. Without such precautions, the thick seam would be cut through by the shearing mechanism with possible damage to the blades. The equipment employed to detect and protect these seams has been relatively complicated and expensive. Also, a certain percentage of the cloth web is wasted by reason of the shearing blades being moved out of shearing position for a limited period.

Accordingly, it is an object of the present invention to provide a novel method for joining web ends without substantially increasing the web thickness.

Another object of this invention is to provide a novel apparatus for bonding a pair of web ends quickly and easily.

Still another object of this invention is to provide an improved apparatus for trimming the ends of the two web lengths.

Yet a further object of this invention is to provide an improved high-speed mechanism for trimming and joining web ends.

More particularly, this invention features the method of joining a pair of webs by spraying along the butted edges of the two webs a mixture of short fibers and a liquid adhesive binder, preferably of a quick setting nature. The applied mixture, when set or cured, forms a tough, flexible connection which does not appreciably increase the thickness of the web whereby any number of webs may be joined end to end and run continuously through a shearing station without the need of the usual seam detection and protection equipment. The same type of bonded seam may be used to advantage when the webs are run through pressing, decanting, calendering and despecking machines.

This invention also features a novel mechanism for clamping and trimming the web ends either before, during or after the bonding mixture is applied.

Figure 4:
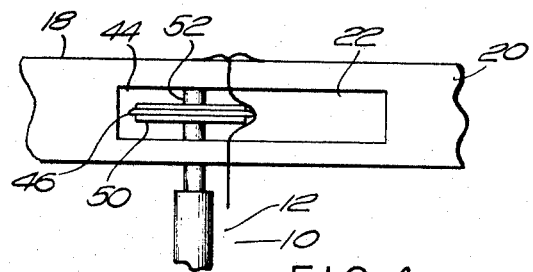
Figure 2:
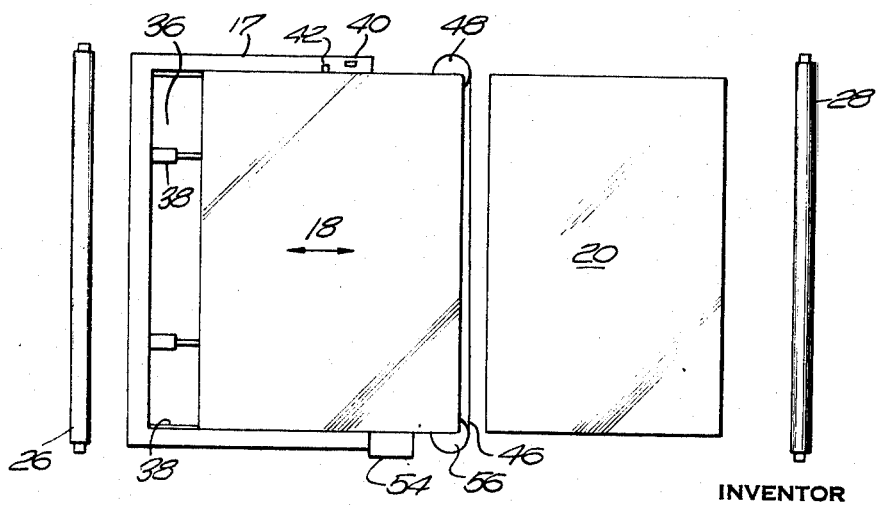
Figure 3:
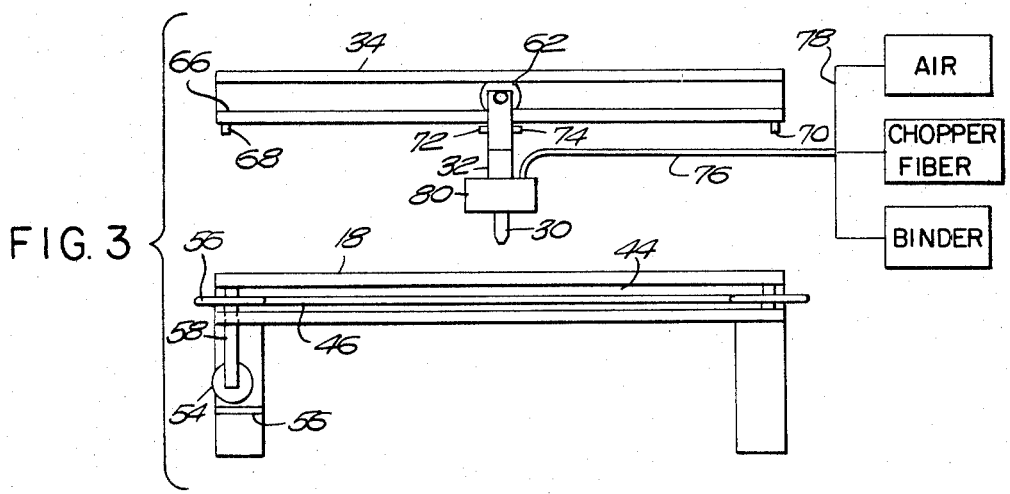
Figure 5:
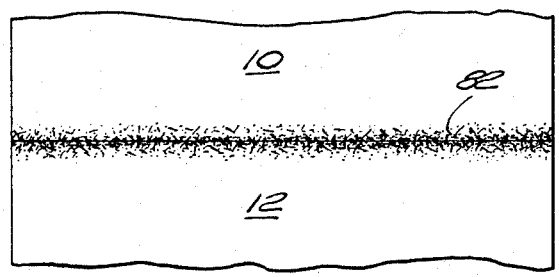
Figure 6:
Figure 7:
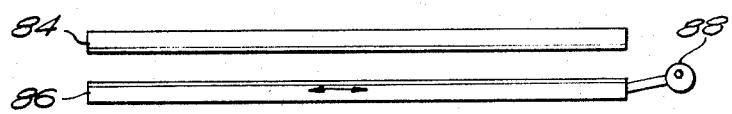

But these and other features of the invention, along with further objects and advantages thereof, will become more fully apparent from the following detailed description of preferred embodiments of the invention, with reference being made to the accompanying drawings, in which:

FIG. 1 is a view in side elevation of a web trimming and bonding apparatus made according to the invention, FIG. 2 is a top plan view of the web trimming table, FIG. 3 is a fragmentary front elevation somewhat schematic of the trimming and bonding apparatus, FIG. 4 is a fragmentary side elevation partly in section of the trimming mechanism with the nipping jaws in a closed position, FIG. 5 is a top plan view showing the end portions of two webs joined by a seam made according to the invention, FIG. 6 is a side elevation of the joint shown in FIG. 5, FIG. 7 is a top plan view showing a modification of the web trimming mechanism.

Referring now to the drawings, the reference character 10 generally indicates a first web and reference character 12 generally indicates a second web, both of which typically are woven fabrics in an unfinished or semi-finished state as they come from the loom, knitting machine or process of manufacturing non-woven webs, as well as webs in process of finishing. Normally, lengths of these webs are wound up on feed rolls 14 and joined end-to-end for feeding a continuous web through a shearing mechanism (not shown).

The apparatus for joining the web ends is generally organized about a two-part table 16 including upright sections 17 and 19. Table section 17 carries a horizontally slideable nipping plate 18 while the table section 19 supports a fixed top 20 having a flat upper surface co-planar with the nipping plate 18. It will be noted in FIG. 1 that the edge of table top 20 facing the nipping plate 18 is formed with horizontal groove 22 for reasons that will presently appear. A cradle 24 is provided at the front end of the table 16 to support a feed roll 14 for unwinding over an idler roll 26 onto the table 16 and over the nipping plate 18. In the practice of this invention, the leading edge of the web 12 is dropped down into the gap between the nipping plate 18 and the table top 20 as is the trailing edge of the web 10. The trailing portion of the web 10 will be seen to overlay the flat upper surface of the table section 19 and is fed forwardly about an idler roll 28.

Mounted directly above the gap between the two table sections is a gun 30 mounted on a carriage 32 and adapted to reciprocate transversely across the width of the two webs along a track 34.

The nipping plate 18 is generally rectangular in cross-section and is mounted for sliding movement to the table section 17 within a recess 36. In practice, the sides of the recess and the side edges of the nipping plate may be splined as at 38, for example, to facilitate a smooth sliding action. A power cylinder 38, either air or hydraulic, is provided between the nipping plate and the back wall of the recess 36 and is employed to reciprocate the nipping plate horizontally. It will be understood that the nipping plate will be moved sufficiently to bring together the opposing edges of the nipping plate and the table top 20 as suggested in FIG. 4. In practice, the operation of the power cylinder 38 will be controlled by means of a limit switch 40 mounted on the fixed portion of the table 16 and in the path of a trip 42 mounted on the nipping plate 18.

As best shown in FIGS. 1 and 4, the edge of the nipping plate 18 opposite the groove 22 in the edge of the table top 20 is also grooved at 44 to accommodate a bandsaw 46 looped over a pair of spaced pulleys 48 and 50 located on either side of the nipping plate. The pulleys are mounted on arbors 52 and positioned so that one side of the bandsaw extends outwardly from the grooved edge of the nipping plate as best shown in FIG. 2. In this fashion, when the nipping plate is reciprocated into the closed position FIG. 4, the opposing edges of the nipping plate and the table top are brought together so that the end portions of the webs 10 and 12 will be pinched and held fast along two spaced parallel lines defined by the edges of the grooves 22 and 24. At the same time, the leading portion of the bandsaw 46 will move partly into the groove 22 to bear against the section of the two webs held between the grooved edges. While the webs are thus held, the bandsaw will be actuated to cut through the two webs and thereby trim the ends evenly and simultaneously.

The bandsaw is operated by means of a motor 54 suspended below the nipping plate 18 by means of a bracket 56 and drivingly coupled to one of the pulley arbors 52 by means of a driveshaft and right angle gear linkage 58 and 60 respectively.

Referring now more particularly to the gun 30 which is employed to form the bond between the web ends, it will be seen in FIGS. 1 and 3 that the gun carriage is power driven by means of a reversible motor 62 mounted to the carriage 32 and drivingly connected to a gear wheel 64 in mesh with the track 34 normally formed with a straight rack segment 66. In practice, limit switches 68 and 70 are mounted at either end of the track 34 to engage either of trips 72 and 74 on the carriage 32 at the end of the path of travel thereof.

The gun 30 is in the form of a nozzle connected by a flexible tubular conduit 76 to a source of bonding medium fed therein under pressure. The bonding medium employed herein is made up of short strands of strong, flexible material such as fiber glass, synthetic and natural fibers and the like, perhaps .5" to 2" in length, dispersed in a quick curing liquid adhesive resinous binder. The short strands, sometimes known as "tow" form a strong flexible bond when applied to the web with the resin and cured. This tow is made from a continuous length of monofilament extruded non-twisted threads cut to predetermined lengths by a cutter in the same gun that sprays the binder. Preferably, a solenoid actuated valve 80 is incorporated into the carriage 32 between the nozzle 30 and the conduit 76 and is operated in conjunction with the carriage motor 62. In practice, the nozzle 30 will be opened by actuation of one of the limit switches 68 or 70 so that the tow and binder will be sprayed together along the web ends during one pass of the carriage 32.

In operation, the mechanism will be cycled automatically after the operator has dropped the free ends of the webs down into the gap between the table sections. By closing a master switch, the nipping plate will close to pinch the web ends together. Next, the carriage and gun will traverse the width of the web, spraying the tow in the form of a stripe over of web ends. When the gun reaches the end of its travel, it will close a limit switch to actuate the bandsaw motor 54 for a short period, thus trimming the web ends, and thereafter the nipping plate will open releasing the now joined webs. Heating elements (not shown) may be provided to accelerate curing of the binder.

Referring now to FIGS. 5 and 6, it will be seen that the mechanism has formed a stratum 82 extending as a stripe over both ends of the trimmed webs 10 and 12. The stratum includes the tow randomly distributed along the surface of the web ends and bonded by the cured binder. In practice, the stratum of two and binder is quite thin and adds no appreciable thickness to the webs. In this fashion, the joined webs may be passed through the shearing station on a continuous basis without the need of detecting the seam or opening the gap between the shearing cutters and the web.

In FIG. 7 there is illustrated a modification of the web trimming mechanism and in this embodiment a fixed cutting element 84 is provided in spaced opposition to an oscillatory cutting element 86. The fixed element 84 would be mounted on the edge of the fixed table top 20 and aligned with the oscillatory element 86 which would be mounted on the edge of the nipping plate. An eccentric drive 88 is provided to oscillate the cutter 86. It will be understood that the free ends of the two webs will be dropped in the gap of the cutting elements and, when the two elements are brought together, the oscillatory drive will be actuated to provide a shearing action which will cut through the two webs.

The apparatus described herein in particularly useful for high-speed finishing machines by reason of the fact that a thin, firm and flexible bond between two web ends may be made in a very short time. This factor is particularly important if the capabilities of a high-speed finishing machine are to be fully realized. The apparatus will function much more quickly and efficiently than a conventional sewing machine and will form the bond without the usual raised seam.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. The method of bonding the ends of two elongated flexible webs, comprising the steps of
    (a) arranging said webs in generally end-to-end coplanar and longitudinally aligned relation,
    (b) trimming the opposing ends thereof along a common transverse path whereby said web ends will butt against one another across the full width of the webs,
    (c) spraying short flexible strands dispersed in a liquid binder along a transverse path sufficiently wide to cover both marginal surfaces of the butted ends to form when cured a flexible stratum of randomly distributed strands bonded to both web ends.

2. Apparatus for bonding the ends of two elongated webs in aligned co-planar relation, comprising
    (a) a planar support for holding said webs in a flat open and generally end-to-end co-planar relation,
    (b) first means for butting together the opposing ends of the webs in longitudinally aligned co-planar relation, and
    (c) second means moveable transversely of said web for applying a mixture of short flexible strands and a liquid binder to the butted ends of the webs.

3. Apparatus according to claim 2 wherein said first means includes a fixed member extending transversely of said webs and a nipping plate parallel thereto and moveable to and away from said fixed member to selectively clamp and release said webs.

4. Apparatus according to claim 2 wherein said second means includes a track extending transversely across the path of said web and spaced therefrom, a carriage mounted for movement along said track, a nozzle mounted on said carriage and a flexible conduit connected at one end to said nozzle at the other end to a pressurized source of said mixture.

5. Apparatus for bonding the ends of two elongated flexible webs, comprising
   (a) a support for holding said webs in a flat open and generally end-to-end co-planar relation,
   (b) web nipping means extending transversely of said webs for trimming and butting the opposing ends of the webs,
   (c) a source of short strands dispersed in a liquid binder,
   (d) a conduit connected at one end to said source, and,
   (e) means for moving the other end of said conduit transversely across the butted ends of said webs to spray said strands and binder onto the web ends.

6. Apparatus for trimming and joining the ends of a pair of elongated webs, comprising
   (a) a support,
   (b) a pair of members mounted to said support and moveable relative to one another to define a closeable gap therebetween,
   (c) said members having transverse dimensions generally corresponding to the width of said webs,
   (d) said members each being formed with oppositely facing grooves,
   (e) a power driven laterally moveable cutting element mounted within one of said grooves and having a cutting edge thereof extending outwardly of said grooves,
   (f) means to move said members to and away from one another whereby the free ends of said webs may be inserted in said gap when said members are apart and said ends may be clamped by the edges of said grooves for cutting by said element when said members are together and,
   (g) means moveable transversely of said web for applying a mixture of short flexible strands and a liquid binder to the butted ends of the webs.

References Cited
UNITED STATES PATENTS

| | | | |
|---|---|---|---|
| 3,294,617 | 12/1966 | May | 161—36 |
| 1,410,899 | 3/1922 | Duncan. | |
| 3,025,195 | 3/1962 | Kozma. | |
| 1,869,011 | 7/1932 | Kuhlke | 156—517 XR |
| 3,107,057 | 10/1963 | Hanusch | 117—105.5 XR |

EARL M. BERGERT, *Primary Examiner.*

PHILIP DIER, *Examiner.*